United States Patent Office 3,065,197
Patented Nov. 20, 1962

3,065,197
PROPYLENE POLYMER STABILIZED WITH A COMBINATION OF AN ALKYL PHENOL-FORMALDEHYDE RESIN AND A 2-THIONO-2-MERCAPTO DIOXAPHOSPHORINANE COMPOUND
Bernard O. Baum, Plainfield, N.J., assignor to Union Carbide Corporation, a corporation of New York
No Drawing. Filed Jan. 5, 1960, Ser. No. 496
12 Claims. (Cl. 260—43)

This invention relates to improved propylene polymer compositions. More particularly, it relates to polypropylene having greatly increased resistance to light and thermal degradation and being substantially light in color.

Solid polypropylene is recognized in the plastics industry as possessing great commercial potential because of some advantages it has over polyethylene. For example, it has a higher melting temperature, a lower density and greater stiffness moduli than polyethylene. Polypropylene polymers can be produced in amorphous or crystalline form depending upon the catalysts employed and the reaction conditions. The highly crystalline polypropylenes having melt indices (measured at 190° C.) within the range of from about 0.01 to about 50 are particularly suitable for use in the production of fibers, films and other extruded and molded items. These high molecular weight, highly crystalline polypropylenes are characterized by their clarity, their high toughness and strength, their good mechanical resiliency and their stiffness moduli.

Unfortunately, propylene polymers are subject to severe deterioration from the oxidative action of air at elevated temperatures. For example, fibers that are melt spun from polypropylene and have high initial strength, 4 to 5 grams per denier, lose about 50 percent of their strength within about 50 hours after being placed in a circulating air oven at 125° C., and tend to disintegrate completely within about 100 hours to a powdery material. The stability of unstabilized crystalline polypropylene to heat aging also varies with the amount of impurities or catalyst residue remaining in the polymer, and in certain cases, the polymer is so unstable that fibers produced therefrom disintegrate within 5 to 10 hours at 125° C. This susceptibility of polypropylene to deteriorate under such conditions is much greater than that observed with most other high molecular weight polyolefin resins. This can be seen when one considers that unstabilized polyethylene fibers can withstand 500 hours at 100° C. without series loss in strength.

While it is known that small amounts of some anti-oxidants, for example, 4,4'-thio-bis(6-tertiarybutyl-3-methylphenol), 2,2 - bis(4 - hydroxyphenyl)propane, diphenylamine, etc., can be added to polypropylenes to prevent degradative effects during the short period the polymer is heated for melt spinning to product fibers, it is not possible by the use of these conventional and well known anti-oxidants to prevent the oxidative degradation that occurs over prolonged exposure to air at temperatures below the belting temperature of polypropylene. For example, the inclusion in a polypropylene fiber of two percent by weight of 4,4'-thio-bis(6-tertiarybutyl-3-methylphenol), which is known to be one of the most effective anti-oxidants for polyethylene, increases the time of exposure at 125° C. required to cause 50 percent loss in strength from 50 hours to only about 150 hours. It can be seen that this is still inferior to unstabilized polyethylene fibers.

Polypropylene can be stabilized against thermally induced degradation with a great variety of phenolic resins, among which are the uniquely effective p-tertiary alkylphenolformaldehyde resins. The so stabilized polypropylene compositions are more resistant to air oxidation and thermal degradation during compounding and are able to endure the forming temperatures with no significant reduction of strength or electrical properties. However, relatively large concentrations, i.e., 0.1 to 1 percent, are needed to provide the degree of stabilization generally required especially for fiber applications. Unfortunately, the phenolic resins impart a brownish-yellow color to the polypropylene. The higher the concentration of the phenolic resin the greater is the discoloration.

It is therefore the general object of the present invention to provide propylene resin compositions containing phenolic resin stabilizers which are even more stable toward light and thermal degradation than heretofore known and in addition are much improved with respect to color.

This general object as well as others which will be obvious from the specification and the appended claims is achieved by the compositions of the present invention which comprise a normally solid polymer of propylene, a p-tertiary-alkylphenol-formaldehyde resin, and a 2-thiono-2-mercapto-1,3,2,dioxaphosphorinane.

The low molecular weight para-tertiaryalkylphenol-formaldehyde resins suitable for use in this invention are the A-stage resins produced by the reaction of para-tertiaryalkyl-phenols with formaldehyde in the presence of a catalyst. The A-stage of a phenol-formaldehyde resin is the early stage in the production of those thermosetting resins in which the product produced is still soluble in certain liquids and fusible. This stage in the production of thermosetting resins is distinguished from the B-stage and C-stage. The B-stage is an intermediate stage in the reaction of a thermosetting resin in which the product softens when heated and swells when in contact with certain liquids, but does not entirely fuse or dissolved. The C-stage is the final stage in the reactions of a thermosetting resin in which the material is relatively insoluble and infusible. Thermosetting resins in a fully cured state are in this stage.

The A-stage resins used as anti-oxidants in this invention are those produced by the reaction of para-tertiary-alkylphenols with formaldehyde in the presence of a suitable catalyst, such as oxalic acid, by procedures which are well known in the plastics art. Among the para-tertiary-alkylphenols which can be used in producing the suitable A-stage resins by reaction with formaldehyde are the para-tertiary alkylphenols, in which the alkyl group contains from 4 to about 20 carbon atoms or more, preferably from 4 to about 10 carbon atoms, such as para-tertiary-butylphenol, para-tertiaryamylphenol, para-tertiaryheptyl-phenol, para-tertiarynonylphenol and the like.

Illustrative of the A-stage resins that can be used to control the oxidative degradation of polypropylene are para-tertiarybutylphenol-formaldehyde resin, para-tertiary-amylphenol-formaldehyde resin, para-tertiarynonyl-phenol-formaldehyde resin, para-tertiarydodecylphenol-formaldehyde resin and the like. The resins can be prepared from the pure para-phenol or from a mixture of para phenol with the ortho and/or meta isomers. However, the effectiveness of the A-stage resins as anti-oxidants is dependent in very large measure upon the para-tertiaryalkylphenol content in the resin. Thus, even though an A-stage resin formed from a mixture of isomeric alkyl-phenols having a major proportion of the para isomer is an effective consituent of the present compositions, larger quantities of the A-stage resin are needed in order to have a sufficient concentration of the para-tertiaryalkylphenol-formaldehyde resin in the polypropylene to give equivalent stabilization to that achieved when a para-tertiarybutylphenol-formaldehyde resin produced from para-tertiarybutylphenol alone is utilized. Also, mixtures of two or more para-tertiary-alkylphenol-formaldehyde resins can be employed.

The 2-thiono-2-mercapto-dioxaphosphorinane compounds which are suitably employed in the compositions of the present invention have the general formula

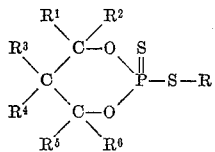

wherein $R^1$, $R^2$, $R^3$, $R^4$, $R^5$ and $R^6$ respectively designate a member of the class consisting of hydrogen and an alkyl group having 1 to 20 carbon atoms, preferably a lower alkyl group containing from 1 to 6 carbon atoms, and R designates a member of the class consisting of hydrogen and a monovalent radical having the general formula

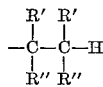

wherein R' is a member selected from the group consisting of hydrogen, the lower alkyl groups containing from 1 to 6 carbon atoms, and wherein R'' is a member selected from the class consisting of hydrogen, cyano, alkyl containing preferably 1 to 6 carbon atoms, and an alkylcarboxy group containing from 1 to 18 carbon atoms in the alkyl group. R' need not be the same radical in each occurrence in the

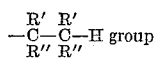 group

Specifically illustrative but in no way limitive thereof of the dioxaphosphorinanes suitably employed in the practice of this invention are 5-ethyl-2-mercapto-4-propyl-2-thiono-1,3,2-dioxaphosphorinane, 2-(β-carbomethoxy-β-methylethylmercapto)-5,5-diethyl-2-thiono - 1,3,2 - dioxaphosphorinane, 2-thiono - 2-[α,β-bis(carboethoxy)ethylmercapto]-5,5-diethyl - 1,3,2 - dioxaphosphorinane, 2-thiono-2-(β-cyanoethylmercapto-5,5-diethyl-1,3,2-dioxaphosphorinane, 2-thione-2-mercapto - 5,5-diethyl - 1,3,2-dioxaphosphorinane, diethyl-1,3,-dioxa-2-thiono-4,4,6-trimethyl-2-phosphacyclohexylthiosuccinate, diethyl - 1,3 - dioxa-4-amyl-2-thiono-2-phosphacyclohexylthio - succinate, 2-(2-carbethoxyethylmercapto) - 4,5-diethyl - 2-thiono - 1,3,2-dioxaphosphorinane, 2-(2-carbobutoxy-1-methylethylmercapto)-5,5-diethyl-2-thiono-1,3,2-dioxaphosphorinane, 2-(2-cyanoethylmercapto)-2-thiono-4,4,6 - trimethyl - 1,3,2-dioxaphosphorinane, 5,5-diethyl-2-(2 - isobutoxyethylmercapto)-2-thiono-1,3,2-dioxaphosphorinane, and the like.

All of the dioxaphosphorinanes employed in the compositions of the present invention are either known in the art or are homologues of the compounds recorded in the literature. In general, those dioxaphosphorinanes which contain carboxylic ester groups are prepared by reacting the heterocyclic dithiophosphoric acid having the general formula

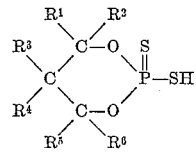

wherein $R^1$, $R^2$, $R^3$, $R^4$, $R^5$ and $R^6$ designate hydrogen or an alkyl group, with an ester of an alpha, beta-olefinically unsaturated carboxylic acid which may be substituted on either or both of the hydrogen atoms attached to the beta-carbon atoms and/or on the hydrogen atom attached to the alpha-carbon atom by an alpha cyano, or esterified carboxyl group. The reaction is general for olefinically unsaturated compounds, as for example, acrylonitrile, and hydrocarbons having olefinic unsaturation in the 1,2 positions. Detailed description of the process for making typical dioxaphosphorinanes of this inventioin is set forth hereinafter in the examples.

Propylene resin compositions having vastly improved thermal stability without any significantly greater discoloration over compositions containing only a phenolic resin stabilizer are, according to this invention, those which contain from about 0.05 percent by weight to about 5.0 percent by weight or greater, preferably from about 0.5 to about 2.0 percent by weight, of an A-stage para-tertiary-alkyl-phenol-formaldehyde resin hereinbefore described, based on the weight of the propylene polymer present, and in combination therewith, a dioxaphosphorinane as hereinbefore described in an amount of from about 10 to about 600 percent, preferably from about 20 to about 200 percent, by weight based on the weight of the phenolic resin stabilizer present.

Whereas the proportion of A-stage phenolic resin to propylene polymer, and the proportion of the dioxaphosphorinanesynergist or promoter to A-stage phenolic resin as set forth above are satisfactory to produce a stable product having a color sufficiently light for all but the most unusual use requirements, it is to be understood that greater or lesser quantities of either the phenolic resin or the dioxaphosphorinane synergist can be utilized without departing from the spirit and proper scope of the present invention. In a practical sense, however, greater latitude can be exercised with respect to the concentration of the phenolic resin than with the dioxaphosphorinane synergist.

The phenolic resin stabilizer and the dioxaphosphorinane synergist can be incorporated into the propylene polymer by any suitable conventional means, for example, by fluxing the propylene polymer with the stabilizer composition on heated rolls, by the use of Banbury mixers, or of heated extruders, and the like.

The following examples will serve to further illustrate the present invention.

In the examples, at each occurrence the following definitions and characterizations apply:

*Yellowness index.*—The yellowness index reported is the quotient of the degree of yellowness divided by the degree of whiteness of any given polypropylene composition tested. Yellowness and whiteness are based on color reflectance measurements made on molded plaque samples by means of a spectrophotometer modified for reflectance measurements (Beckman Model "B" abridged). The reflectance over vitrolite, an arbitrarily chosen reflectance standard, was measured on the plaque samples at wave length of 550 mμ and 430 mμ. Whiteness is based on the percentage reflectance at 550 mμ and yellowness is based on the percentage reflectance at 430 mμ. The yellowness index is therefore equal to $$\frac{R_{550\ m\mu} - R_{430\ m\mu}}{R_{550\ m\mu}}$$

in which R is the percentage reflectance at the wave length indicated by the subscript. The smaller the quotient, the lighter the color of the composition.

*Polypropylene resin.*—The propylene homopolymer employed is a typical normally solid polypropylene having a melt index of 3.1 decigrams per minute, a density of 0.908 gram per milliliter at 23° C. and a tensile modulus of 138,000 pounds per square inch.

*Thermal stability (induction period in hours in air at 150° C.).*—As a measure of the thermal stability, the composition tested was compressed molded into 30 mil thick plaques which were then suspended in a 150° C. circulating air oven. Periodically the plaques were examined and subjected to a manually applied bending force. The plaques either sustained the applied force without discernible ill effects or crumbled into small powdery fragments. The plaques did not exhibit any in-between behavior. The time period during which the plaque could resist the applied force is called the induction period.

*Phenolic stabilizer.*—An A-stage para-tertiaryamyl-phenol-formaldehyde resin having a softening point of 185° F. prepared by the oxalic acid catalyzed condensation of para-tertiaryamylphenol and formaldehyde under reflux conditions. The condensation product mass was then vacuum distilled to remove formed water, unreacted phenol and low molecular weight condensation products, and thereafter cooled and ground.

EXAMPLE 1

2 - (2 - cyanoethylmercapto) - 5 - ethyl - 4 - propyl - 2 - thiono-1,3,2-dioxaphosphorinane was prepared by the dropwise addition of 53 g. (1.0 mol) of acrylonitrile to 72 g. (0.3 mol) of 5-ethyl-2-mercapto-4-propyl-2-thiono-1,3,2-dioxaphosphorinane over a period of 15 minutes. It was necessary to cool the reaction mixture in order to maintain the kettle temperature at 42–50°. The reaction mixture was then stirred at 25° for 3 additional hours and stripped by distillation at 70°/<3 mm. There was obtained 85 g. of yellow liquid residue which was found to have the following properties: acidity=0.06 cc. of N base/g., $n_D^{30}$=1.5315, percent S=21.60 (the theory=21.85), molecular weight (ebullioscopic)=301.6 (theory=293.4), percent yield=87, percent P=10.52 (theory=10.55), percent N=4.40 (theory=4.78), percent C=45.09 (theory=45.02), percent H=6.95 (theory=6.87).

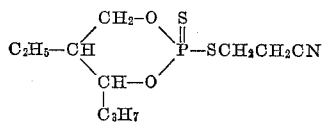

EXAMPLE 2

2 - (2 - carbomethoxy - 2 - methylethylmercapto) - 5,5-diethyl-2-thiono-1,3,2-dioxaphosphorinane was prepared by the dropwise addition of 100 g. (1.0 mol) of methyl methacrylate containing 0.1 g. of hydroquinone to an agitated suspension of 68 g. (0.3 mol) of 5,5-diethyl-2-mercapto-2-thiono-1,3,2-dioxaphosphorinane in 200 g. of toluene over a period of 15 minutes. There was no apparent heat of reaction. After standing at 25° for 5 days the reaction mixture was neutralized using dilute aqueous sodium bicarbonate, diluated with 600 cc. of ethyl ether, washed with water, inhibited with 0.1 g. hydroquinone, and stripped by distillation at 80°/<0.5 mm. There was obtained 94 g. of brown, viscous residue which was distilled at 135°/<0.2 mm. using a falling film type still. The 34 g. of pale yellow, fluid, liquid distillate had the following properties: acidity=0.05 cc. of N base/g., salt=nil, molecular weight=336.6 (theory=326.4), percent P=9.36 (theory=9.49), percent S=19.1 (theory=19.64), percent C=46.0 (theory=44.15), percent H=7.4 (theory=7.10), percent yield=35.

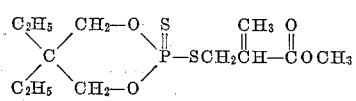

EXAMPLE 3

Diethyl 1,3 - dioxa - 5 - ethyl - 4 - propyl - 2 - thiono-2-phosphacyclohexylthiosuccinate was prepared by pouring together into a reaction flask 38 g. (0.158 mol) of 5 - ethyl - 2 - mercapto - 4 - propyl - 2 - thiono - 1,3,2-dioxaphosphorinane and 50 g. (0.29 mol) of diethyl maleate. It was observed that the reaction temperature immediately jumped to 60° C. The temperature was then brought to 100° C. over a period of 10 minutes and the reaction mixture was heated 8 hours at 100°. An additional 25 g. (0.145 mol) of diethyl maleate was added and the reaction mixture was heated at 100° for 7 additional hours. An acidity determination indicated the reaction to be 93% complete. The reaction mixture was then washed using dilute aqueous sodium bicarbonate, washed twice with water, and stripped by distillation at 120°/<2 mm. There was obtained 55 g. of clear, slightly yellow residue which had an obnoxious odor. It had the following properties: percent P=7.36 (theory=7.51), acidity=0.02 cc. of N base/g., salt=0.03 cc. of N HClO₄/g., $n_D^{30}$=1.5009, percent S=14.8 (theory=15.54), percent yield=85 (based on the phosphorus compound), percent C=46.68 (theory= 46.59), percent H=7.02 (theory=6.84).

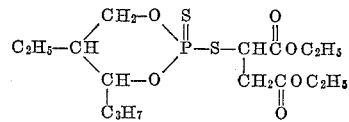

EXAMPLES 4–8

The synergistic stabilizing action of the dioxaphosphorinane compound with the phenolic resin stabilizers in accordance with the present invention was demonstrated by preparing a series of polypropylene compositions, some of which contained both a dioxaphosphorinane and phenolic resin, and some of which contained only the dioxaphosphorinane. The compositions were prepared by admixing the modifiers with the polypropylene immediately after the polypropylene had been fluxed and sheeted on a two-roll mill at 170° C. The modifiers were thoroughly blended with the fluxed polypropylene by successively end-passing the mixture through the mill nip ten times. For control the same polypropylene was hot processed according to the same procedure, one portion receiving no modifiers, and three portions being admixed with the phenolic resin stabilizer in amounts of 0.5 percent, 1.5 percent, and 2.0 percent by weight respectively. A portion of all compositions so prepared was compression molded and subjected to testing. The results are reported in Table I below.

TABLE I

*Polypropylene Composition*

| Ex. | Additive | Conc. of Additives (a) | Thermal Stability (b) | Yellowness Index |
|---|---|---|---|---|
| Control | none | | 4 | 0.30 |
| | p-t-amylphenol/CH$_2$O resin | 0.5 | 26 | 0.61 |
| | do | 1.5 | 70 | 0.78 |
| | do | 2.0 | 94 | 0.85 |
| | 5-ethyl-2-mercapto-4-propyl-2-thiono-1,3,2-dioxaphosphorinane | 0.5 | 12 | |
| | 2-($\beta$-carbomethoxy-$\beta$-methylethylmercapto)-5,5-diethyl-2-thiono-1, 3, 2 - dioxaphosphorinane. | 0.5 | 12 | |
| | 2-thiono - 2 - [$\alpha$,$\beta$-bis(carboethoxy)ethylmercapto] - 5,5 - diethyl - 1,3,2 - dioxaphosphorianne. | 0.5 | 12 | |
| | 2-thiono-2-($\beta$-cyanoethylmercapto)-5,5-diethyl-1,3,2,-dioxaphosphorinane | 0.5 | 12 | |
| | 2-thiono-2-mercapto-5,5-diethyl-1,3,2-dioxaphosphorinane | 0.5 | 30 | |
| 4 | p-t-amlyphenol/CH$_2$O resin + 5-ethyl-2-mercapto-4-propyl-2-thiono-1,3,2-dioxaphosphorinane | 1.0<br>0.5 | 170 | 0.49 |
| 5 | p-t-amylphenol/CH$_2$O resin + 2-($\beta$-carbomethoxy-$\beta$-methylethylmercapto) - 5 - 5 - diethyl - 2 - thiono - 1,3,2 - dioxaphosphorinane. | 1.0<br>0.5 | 170 | 0.58 |
| 6 | p-t-amylphenol/CH$_2$O resin + 2-thiono - 2 - [$\alpha$,$\beta$ - bis(carboethoxy)ethylmercapto]- 5, - diethyl - 1,3,2 - dioxaphosphorinane. | 1.0<br>0.5 | 120 | 0.76 |
| 7 | p-t-amylphenol/CH$_2$O resin + 2-thiono-2-($\beta$-cyanoethylmercapto)-5,5-diethyl-1,3,2-dioxaphosphorianne. | 1.0<br>0.5 | 170 | 0.62 |
| 8 | p-t-amylphenol/CH$_2$O resin + 2-thiono-2-mercapto-5,5-diethyl-1,3,2-dioxaphosphorinane | 1.0<br>0.5 | 170 | 0.51 | a Percent by weight based on the weight of polypropylene.
b Induction period at 150° C. in air, hrs.

It can readily be seen from the data in Table I that the phenolic resins, when used alone, stabilize polypropylene against air oxidation at 150° C., but cause pronounced yellowing, and that both the stabilizing action and the yellowing become greater with increasing phenolic resin concentration. It is also apparent that the dioxaphosphorinane synergists, when used alone, have a small to negligible effect on the stability of polypropylene in air at 150° C. However, when the dioxaphosphorinane synergists are employed in combination with the phenolic resin stabilizer, the stabilizing effect of said resin is greatly upgraded, and the color in many instances is even lighter than with the phenolic resin alone. The combination of the phenolic resin stabilizer and the dioxaphosphorinane synergist provides a degree of stability which could not otherwise be attained without causing the color to become unacceptable for many commercial applications.

EXAMPLE 9

A styrene-propylene copolymer having a melt index of about 0.03 and containing an interpolymerized styrene to propylene ratio of 18:82 was blended with .5 percent by weight of an A-stage p-tertiarybutylphenol/CH$_2$O resin having a softening point of 266° F. and a specific gravity of 1.04 and prepared by the oxalic acid catalyzed condensation of p-tertbutylphenol and formaldehyde under reflux conditions. A portion of this blend was further blended with .5% by weight of the dioxaphosphorinane of Example 8. Each of the compositions was compression molded and yellowness index and thermal stability determinations were made. The compression molded sample containing both the phenolic resin stabilizer and the dioxaphosphorinane synergist was found to resist embrittlement in air at 150° C. for a period of at least 70 hours longer than the sample containing only the phenolic resin stabilizer. The yellowness index was decreased from 0.68 to 0.29 by the addition of the dioxaphosphorinane.

The polypropylene compositions of the present invention find particular utility, because of their resistance to oxidation degradation, as extruded or spun textile fibers and yarns. These compositions find additional utility in the form of films and sheets suitable for packaging, and in the form of a wide variety of extruded and molded articles. The propylene resins effectively stabilized by the stabilizer compositions of the present invention include copolymers of propylene and other olefinically unsaturated monomers such as ethylene and propylene provided the propylene interpolymerized therein is present in an amount of at least about 50 percent by weight, preferably at least about 80 percent by weight. The term "propylene resin" or "propylene polymer" as used herein is intended, therefore, to include such copolymers as well as propylene homopolymers.

The composition can also include conventional additives such as colorants, lubricants, slip agents, plasticizers, fillers and the like, and can be admixed with other polymeric materials either compatible or incompatible with polypropylene.

What is claimed is:

1. A propylene resin composition haivng improved stability toward heat and light induced molecular degradation which comprises a normally solid propylene polymer, a stabilizing amount of an A-stage para-tertiaryalkylphenol-formaldehyde resin in which the alkyl group of the para-tertiaryalkylphenol contains from 4 to 20 carbon atoms, and a phosphorus-containing synergist compound for promoting the stabilizing action of said A-stage phenolic resin, said synergist compound having the general formula

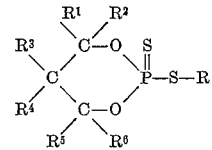

wherein $R^1$, $R^2$, $R^3$, $R^4$, $R^5$ and $R^6$ are respectively a member of the class consisting of hydrogen and an alkyl group having from 1 to 20 carbon atoms and R is a member of the class consisting of hydrogen and a monovalent hydrocarbon radical having the general formula

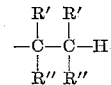

wherein R' is a member selected from the group consisting of hydrogen and a lower alkyl group containing from 1 to 6 carbon atoms, and R" is a member selected from the group consisting of hydrogen, cyano, alkyl, and an alkylcarboxy group containing from 1 to 18 carbon atoms in the alkyl group.

2. The composition of claim 1 wherein the alkyl group of the para-tertiaryalkylphenol contains from 4 to 10 carbon atoms.

3. The composition of claim 2 wherein the A-stage para-tertiaryalkylphenol-formaldehyde resin is present in an amount of from about 0.05 to about 5.0 percent by weight based on the weight of the propylene polymer, and wherein the phosphorus-containing synergist compound is present in an amount of from about 10 to about 600 percent by weight based on the weight of the A-stage phenolic resin.

4. The composition of claim 3 wherein the phosphorus-containing synergist compound is present in an amount of from about 20 to about 200 percent by weight based on the weight of the A-stage phenolic resin.

5. The composition of claim 3 wherein the phosphorus containing compound has the general formula

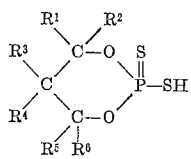

wherein $R^1$, $R^2$, $R^3$, $R^4$, $R^5$, and $R^6$ are respectively a lower alkyl group containing from 1 to 6 carbon atoms.

6. The composition of claim 3 wherein the phosphorus containing compound is 2-mercapto-2-thiono-1,3,2-dioxaphosphorinane.

7. The composition of claim 3 wherein the propylene polymer is a normally solid propylene homopolymer.

8. The composition of claim 7 wherein the phosphorus-containing synergist compound is 2-(2-cyanoethylmercapto) - 5-ethyl-4-propyl-2-thiono-1,3,2-dioxaphosphorinane.

9. The composition of claim 7 wherein the phosphorus-containing synergist compound is 2(2-carbomethoxy-2-methylethylmercapto) - 5,5 - diethyl - 2 - thiono-1,3,2-dioxaphosphorinane.

10. The composition of claim 7 wherein the phosphorus-containing synergist compound is diethyl 1,3-dioxa-5-ethyl-4-propyl-2-thiono-2-phosphacyclohexylthiosuccinate.

11. The composition of claim 7 wherein the phosphorus-containing synergist compound is 5-ethyl-2-mercapto-4-propyl-2-thiono-1,3,2-dioxaphosphorinane.

12. The composition of claim 7 wherein the phosphorus-containing synergist compound is 2-thiono-2-mercapto-5,5-diethyl-1,3,2-dioxaphosphorinane.

References Cited in the file of this patent

UNITED STATES PATENTS

| | | |
|---|---|---|
| 2,163,637 | Thomas | June 27, 1939 |
| 2,240,582 | Sparks | May 6, 1941 |
| 2,834,798 | Hechenbleikner et al. | May 13, 1958 |

UNITED STATES PATENT OFFICE

CERTIFICATE OF CORRECTION

Patent No. 3,065,197                                November 20, 1962

Bernard O. Baum

It is hereby certified that error appears in the above numbered patent requiring correction and that the said Letters Patent should read as corrected below.

Column 1, line 48, for "series" read -- serious --; line 59, for "belting" read -- melting --; column 3, line 5, for "consituent" read -- constituent --; line 65, for "-thione-" read -- -thiono-; column 5, line 21, for "compressed" read -- compression --; column 6, line 2, for "diluated" read diluted --; line 4, for "hydroquinone" read -- hydroquinone --; columns 7 and 8, Table I, opposite Ex. 6, for "-5,-diethyl-1,3,2-" read -- -5,5-diethyl-1,3,2- --; same table, opposite Ex. 7, for "-dioxaphosphorianne" read -- -dioxaphosphorinane --.

Signed and sealed this 27th day of August 1963.

(SEAL)
Attest:

ERNEST W. SWIDER
Attesting Officer

DAVID L. LADD
Commissioner of Patents